United States Patent
Blouin et al.

(10) Patent No.: US 7,284,120 B2
(45) Date of Patent: Oct. 16, 2007

(54) METHOD AND SYSTEM FOR ALLOWING A SYSTEM UNDER TEST (SUT) TO BOOT A PLURALITY OF OPERATING SYSTEMS WITHOUT A NEED FOR LOCAL MEDIA

(75) Inventors: Eric E. Blouin, Ardmore, PA (US); Brian J. Jaeger, Chapel Hill, NC (US); Barry A. Kritt, Raleigh, NC (US); Douglas A. Law, Chapel Hill, NC (US); Kuldip Nanda, Apex, NC (US); Paul A. Roberts, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 424 days.

(21) Appl. No.: 10/715,961

(22) Filed: Nov. 17, 2003

(65) Prior Publication Data

US 2005/0108512 A1 May 19, 2005

(51) Int. Cl.
*G06F 9/00* (2006.01)
*G06F 15/177* (2006.01)

(52) U.S. Cl. ............... 713/2; 713/2; 713/100; 709/217; 709/218; 709/219; 709/220; 709/221; 709/222; 717/174; 717/175; 717/176; 717/177; 717/178

(58) Field of Classification Search ............ 713/1, 713/2, 100; 709/217–222; 438/14–18; 717/168–178
See application file for complete search history.

(56) References Cited

U.S. PATENT DOCUMENTS

| | | | |
|---|---|---|---|
| 4,868,875 A | 9/1989 | Goatman | |
| 5,136,705 A | 8/1992 | Stubbs et al. | |
| 5,901,289 A | 5/1999 | Leonard et al. | |
| 5,948,101 A * | 9/1999 | David et al. | 713/2 |
| 6,285,967 B1 | 9/2001 | Rajan et al. | |
| 6,327,706 B1 * | 12/2001 | Amberg et al. | 717/174 |
| 6,349,341 B1 | 2/2002 | Likes | |
| 6,351,769 B1 | 2/2002 | King et al. | |
| 6,370,641 B1 | 4/2002 | Maia | |
| 6,473,857 B1 * | 10/2002 | Panas et al. | 713/2 |

(Continued)

*Primary Examiner*—Rehana Perveen
*Assistant Examiner*—James F. Sugent
(74) *Attorney, Agent, or Firm*—Sawyer Law Group LLP

(57) ABSTRACT

A computer manufacturing system is disclosed. The computer manufacturing system comprises a system under test (SUT), the SUT including a network adapter and a boot loader for loading the appropriate operating system. The SUT further includes a station for receiving customer orders for the SUT, the station including a sequencer. The sequencer obtains a boot selection file for the SUT from a directory. The SUT further retrieves and parses the boot selection file to obtain the operating system image to load and boot until the SUT is configured with the appropriate date. A system and method in accordance with the present invention provides a means for a computer being manufactured (hereinafter called a system under test, or SUT) to boot an operating system without the need for any local media. In addition, it allows the SUT to boot any one of several operating systems as required, depending on the tools being run during that portion of the process. The system in accordance with the present invention allows the operating system to be specified as an attribute of a manufacturing operation. The system in accordance with the present invention can switch between operating systems as required by the operations to be performed as specified by the appropriate personnel.

12 Claims, 5 Drawing Sheets

U.S. PATENT DOCUMENTS

| | | |
|---|---|---|
| 6,477,486 B1 | 11/2002 | Ram et al. |
| 6,499,115 B1 * | 12/2002 | Wiedeman et al. ............ 714/30 |
| 6,557,128 B1 | 4/2003 | Turnquist |
| 6,560,706 B1 * | 5/2003 | Carbajal et al. ............. 713/155 |
| 6,615,406 B1 * | 9/2003 | Amberg et al. ............. 717/177 |
| 6,651,093 B1 * | 11/2003 | Wiedeman et al. .......... 709/221 |
| 6,654,347 B1 | 11/2003 | Wiedeman et al. |
| 6,718,373 B1 * | 4/2004 | Bearden et al. ............. 709/220 |
| 6,721,762 B1 | 4/2004 | Levine et al. |
| 6,807,665 B2 * | 10/2004 | Evans et al. ................. 717/175 |
| 6,826,710 B2 * | 11/2004 | Merkin et al. ................... 714/6 |
| 6,859,925 B2 * | 2/2005 | Lin ............................. 717/178 |
| 6,910,064 B1 * | 6/2005 | Astarabadi et al. ......... 709/203 |
| 6,973,564 B2 | 12/2005 | Merkin et al. |
| 7,000,231 B1 * | 2/2006 | Gold .......................... 717/174 |
| 7,039,682 B2 | 5/2006 | Baitinger et al. |
| 7,047,403 B2 * | 5/2006 | Lin ............................ 713/100 |
| 7,062,645 B2 | 6/2006 | Kroening |
| 7,085,921 B2 * | 8/2006 | Frye, Jr. ........................ 713/1 |
| 7,093,124 B2 * | 8/2006 | Girard ........................ 713/164 |
| 2002/0162059 A1 | 10/2002 | McNeely et al. |
| 2002/0188514 A1 | 12/2002 | Kritt et al. |
| 2003/0028629 A1 | 2/2003 | Amro et al. |
| 2003/0046529 A1 * | 3/2003 | Loison et al. ................... 713/2 |
| 2003/0208712 A1 | 11/2003 | Louden et al. |
| 2004/0199758 A1 * | 10/2004 | Meaney et al. ................. 713/2 |
| 2005/0055688 A1 * | 3/2005 | Barajas et al. ............. 717/174 |
| 2005/0066015 A1 * | 3/2005 | Dandekar et al. ........... 709/220 |
| 2005/0198629 A1 * | 9/2005 | Vishwanath ................ 717/174 |

\* cited by examiner

10

METHOD AND SYSTEM FOR ALLOWING A SYSTEM UNDER TEST (SUT) TO BOOT A PLURALITY OF OPERATING SYSTEMS WITHOUT A NEED FOR LOCAL MEDIA

FIELD OF THE INVENTION

The present invention relates generally to computer systems and more particularly to the manufacturing of computer systems.

BACKGROUND OF THE INVENTION

FIG. 1 is a block diagram of a conventional architecture 10 for manufacturing a computer system. The conventional architecture 10 includes a Level 2 server 12. There is one level 2 server per physical line. The level 2 server 12 receives information for manufacturing a particular system under test (SUT). The level 2 server functions as an image repository and a legacy code repository. The level 2 server 12 is coupled to an Ethernet switch 13. The Ethernet switch 13 provides access to a plurality of level 1 servers. The level 1 server 14 includes a Windows-based server, a PXE Server (DOS only), and a DHCP Server. The level 1 server 14 is capable of preloading the appropriate image on each of a plurality of SUTs 18.

Traditional computer manufacturing processes such as those illustrated in FIG. 1 rely on two things. First, they rely on local media to boot an SUT in the "manufacturing environment," that is a pre-boot environment. At this point, the SUT has no operating system, minimal resources and minimal capabilities. The media could be an internal or external diskette, CD-ROM, or a USB memory device. Secondly, they rely on booting one particular operating system that the manufacturing process tools are standardized on. For example, the manufacturing process may be DOS-based or Linux-based. Once the OS is booted, additional process data can be obtained from the boot device, a network connection, or an HDD that was preloaded prior to machine assembly. If more than one operating system is required, the operator is required to "change media" and re-boot. Managing different boot media requires boot media creation, labeling, wear management, and level control. Using local boot media also presumes that this media exists on all products or that a slave device such as a USB diskette drive can be inserted and removed from the process as necessary.

Software services exist that are written to the particular standards, such as the Intel PXE standard. These services provide a way for a known MAC address to be bound to an image based on tables that are set up in advance of the boot event. Alternatively, the service can be configured such that all machines of a given architecture get the same boot image. However, this does not provide a way to specify what image a particular SUT gets when the MAC address is unknown until runtime. In addition, there is no mechanism for selecting an image from a set of images based on where an SUT is within the process.

In addition, there are many "server dense" architectures such as the BladeCenter system manufactured by IBM Corporation. In such an architecture a single SUT includes up to 14 separate processing units therein. Typically, each of the processing units requires different operating system configurations. There is no simple solution to specify images for each of the different processing units.

Competitors, particularly those that do small volumes, may choose to handle manufacturing requirements manually using highly-trained operators. However, the lack of automation would reduce quality due to human error. A high-volume manufacturer will find a manual process unacceptable.

Accordingly, what is needed is a system and method for overcoming the above-identified problem. The present invention addresses such a need.

SUMMARY OF THE INVENTION

A computer manufacturing system is disclosed. The computer manufacturing system comprises a system under test (SUT), the SUT including a network adapter and a boot loader for loading the appropriate operating system. The SUT further includes a station for receiving customer orders for the SUT, the station including a sequencer. The sequencer obtains a boot selection file for the SUT from a directory. The SUT further retrieves and parses the boot selection file to obtain the operating system image to load and boot until the SUT is configured with the appropriate data.

A system and method in accordance with the present invention provides a means for a computer being manufactured (hereinafter called a system under test, or SUT) to boot an operating system without the need for any local media. In addition, it allows the SUT to boot any one of several operating systems as required, depending on the tools being run during that portion of the process. The system in accordance with the present invention allows the operating system to be specified as an attribute of a manufacturing operation. The system in accordance with the present invention can switch between operating systems as required by the operations to be performed as specified by the appropriate personnel.

DETAILED DESCRIPTION

The present invention relates generally to computer systems and more particularly to the manufacturing of computer systems. The following description is presented to enable one or ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a method and system in accordance with the present invention, prior to a manufacturing run, all necessary boot images are created and put on the manufacturing server. During run-time, a system and method in accordance with the present invention identifies the system under test (SUT) architecture, assigns an IP address, and loads the operating system through the SUT's network adapter. The manufacturing server is responsible for IP address assignment as well as providing the boot selection file to the SUT. A significant amount of the system capability in accordance with the present invention, resides in the pre-boot code. This pre-boot code runs on the SUT and is responsible for.

1. Ensuring that the networking software is loaded
2. Identifying the particular SUT
3. Changing the configured SUT identification into an entry in the SUT-specific directory.
4. Requesting the boot selection file based upon the SUT-specific identification
5. Boot-strapping the specified operating system based on the contents of the boot selection file The operating system boot image required for each portion of the manufacturing process is specified as part of the product process definition. This definition is stored in the SUT-specific directory on the manufacturing server. Just prior to engaging the system in accordance with the present invention, the boot selection file on the server is updated, again in the SUT-specific directory. The SUT is then re-booted. The pre-boot code on the SUT will then retrieve and parse the boot selection file to obtain the operating system image to load and boot. This can be repeated as necessary throughout the process of configuring the SUT with the appropriate information.

Figure 1:
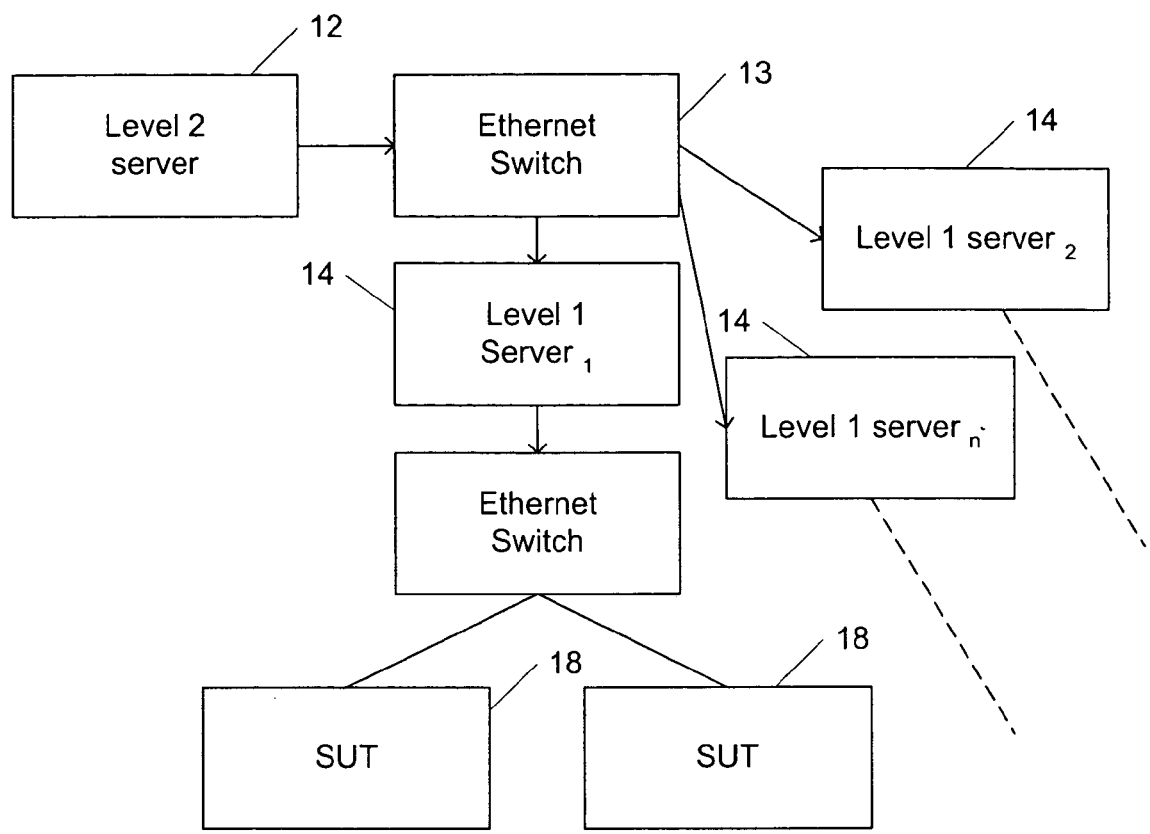
FIG. 1 is a block diagram of a conventional architecture for manufacturing a computer system.
Figure 2:
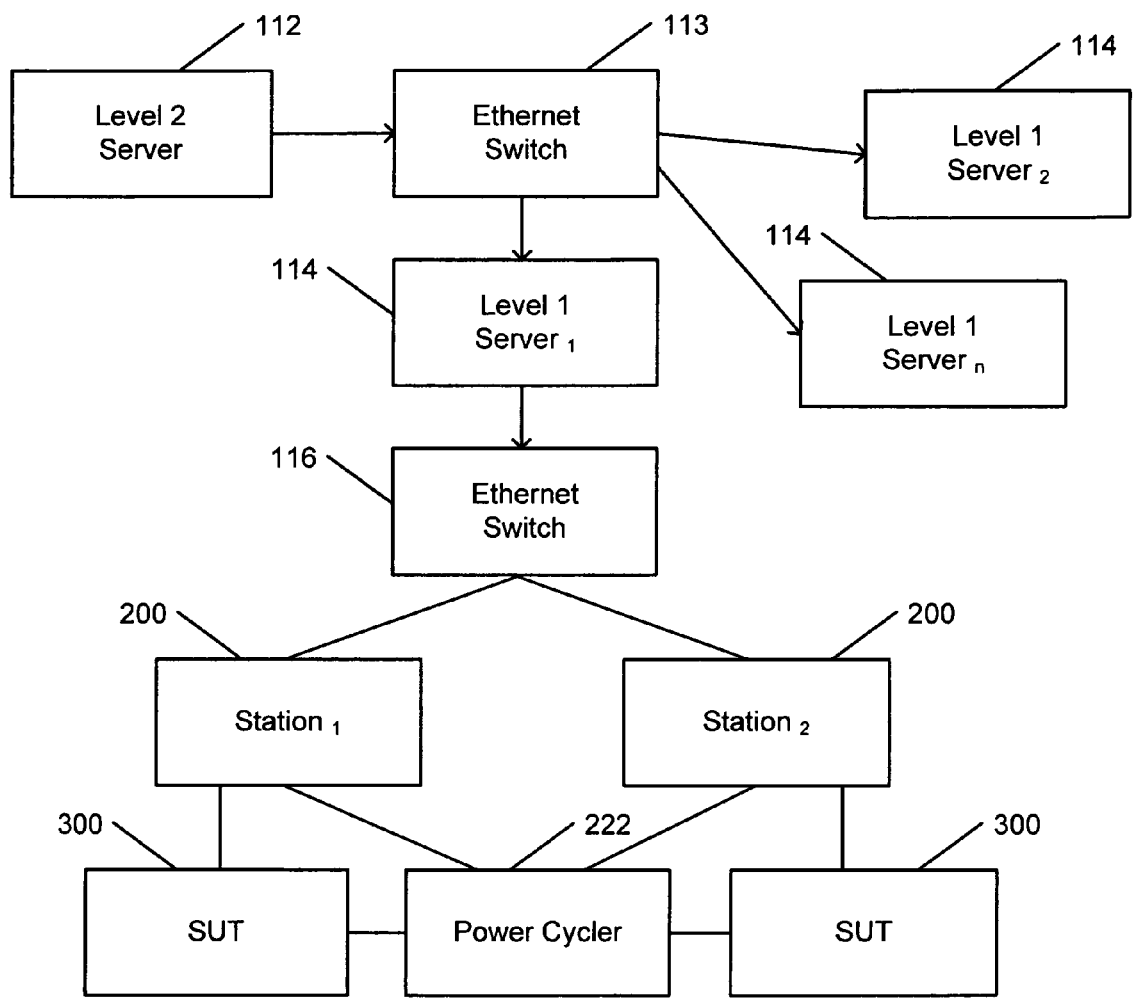
FIG. 2 is a block diagram of an architecture for manufacturing a computer system in accordance with the present invention.

To describe the features of the present invention in more detail, refer now to the following description along with the accompanying figures. FIG. 2 is a block diagram of an architecture 100 for manufacturing a computer system in accordance with the present invention. The architecture includes a level 2 server 112. The level 2 server 112 functions as an image repository and a legacy code repository. The level 2 server 112 includes an SUT specific directory that stores the product process definition for the SUTs associated with the manufacturing process. The level 2 server 112 passes customer orders to the stations 200. The level 2 server 112 also launches code which performs the initial binding. The level 2 server 112 is coupled to a first Ethernet switch 113. The first Ethernet switch 113 provides access to a plurality of level 1 servers 114. The level 1 server 114 includes a plurality of servers such as a Windows-based server, a PXE Server (DOS only), and a DHCP Server. Each of the level 1 servers 114 contains a SUT-specific (MTSN) directory. Each of the level 1 servers 114 is coupled to a second Ethernet switch 116. The second Ethernet switch 116 is coupled to a plurality of stations 200. Each station 200 is coupled to one system under test (SUT) 300.

Figure 3:
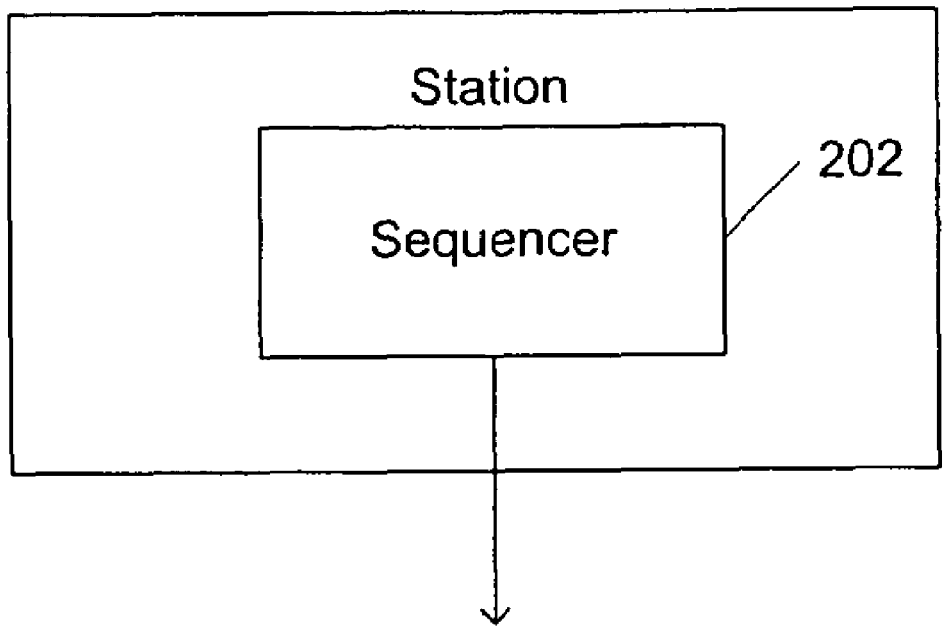
FIG. 3 is a block diagram of a station in accordance with the present invention.

FIG. 3 is a block diagram of a station in accordance with the present invention. The station 200 in a preferred embodiment is LINUX-based. The station 200 includes a sequencer 202 for providing the appropriate operating system from the level 1 server 114 at the appropriate time in the manufacturing process. Accordingly, there is a one-to-one relationship between a station and an SUT.

The station 200 performs the in-process binding. The station 200 also launches the sequencer 202 based on the process definition file in the MTSN directory for a given SUT. Commands are executed on the station 200 for controlling the power cycler or for providing service processor communication. The station 200 is preferably LINUX-based and includes a sequencer 202 that allows for identifying of each SUT. Referring back to FIG. 2, a power cycler 222 is coupled to the SUTs and the stations for cycling the SUTs on and off as required based upon commands from the stations.

Figure 4:
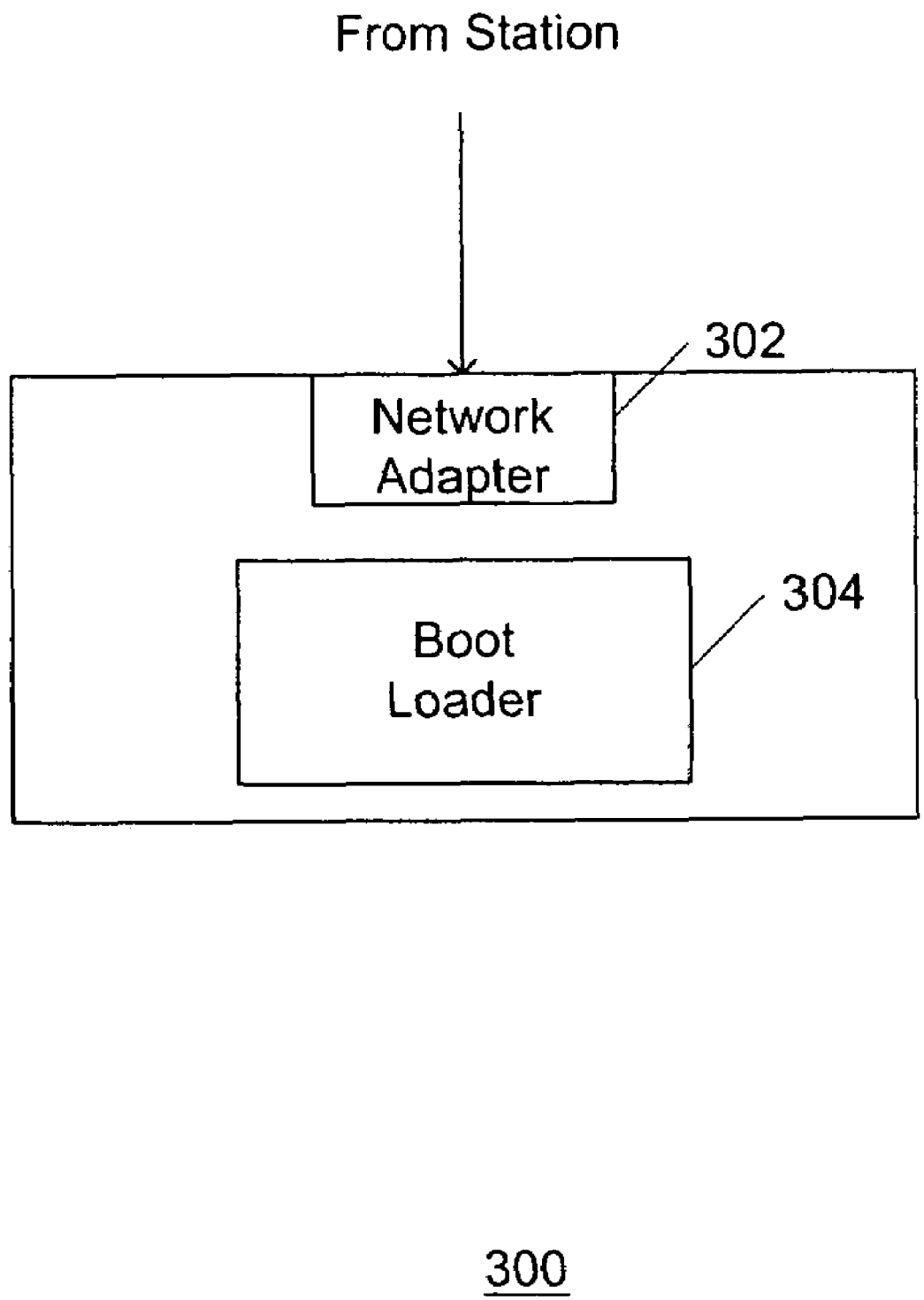
FIG. 4 is a diagram of a SUT in accordance with the present invention.

FIG. 4 is a diagram of a SUT 300 in accordance with the present invention. The SUT 300 includes a network adapter 302 and boot loader 304. The network adapter 302 is standard protocol compatible, such as being compatible with the PXE protocol. The boot loader 304 interacts with the sequencer 202 of station 200 to provide the appropriate operating system to the SUT in the manufacturing process. Commands are executed locally on the SUT to provide the booting of the SUT for the various manufacturing operations. Accordingly, the station 200 upon receipt of the proper commands from the level 1 server interacts with the SUT 300 to facilitate the manufacturing process. To describe this interaction in more detail, refer to the following discussion in conjunction with the accompanying figures.

Figure 5:
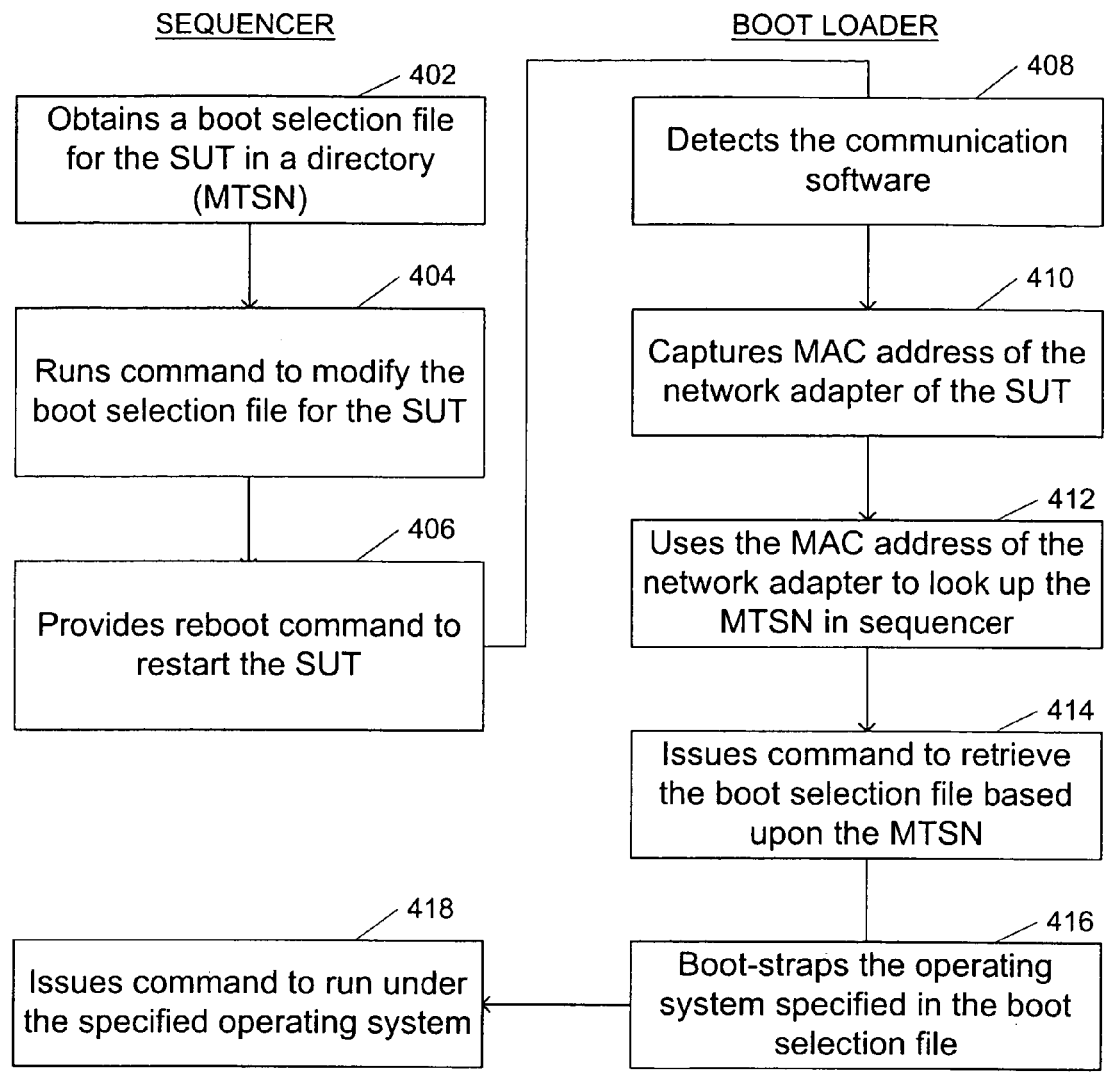
FIG. 5 is a flow chart which illustrates the interaction between the sequencer 202 of the station and the boot loader of the SUT.

FIG. 5 is a flow chart which illustrates the interaction between the sequencer 202 of the station 200 and the boot loader 304 of the SUT 300. First, the sequencer 202 obtains a boot selection file for the SUT 300 in the directory (MTSN) of the level 1 server 114, via step 402. The sequencer 202 can operate on a single processing unit within the SUT 300 or as in a multiple processor architecture such as the BladeCenter architecture by IBM Corporation. In a multiprocessor environment the sequencer 202 provides directory environment locations for each of the processing units and at each point in time in the manufacturing process.

Next, the sequencer 202 runs a command to modify the boot selection file for the SUT, via step 404. Then the sequencer 202 provides a re-boot command to restart the SUT 300, via step 406. Thereafter, the pre-boot code of the boot loader 304 in the SUT 300 is activated.

The boot loader 204 detects that the communication software (i.e. internet protocol stack) the SUT 300, is loaded, via step 408. Then the SUT 300 captures a MAC address from the network adapter 302, via step 410. Next, the boot loader 304 uses the MAC address to look up the MTSN in the sequencer 202, via step 412. Then, the boot loader 304 issues a command to retrieve the boot selection file based upon the MTSN, via step 414. The boot loader 304 then boot-straps the operating system specified in the boot selection file from the network, via step 416. Finally, the sequencer 202 issues the first command to run under a specified operating system, via step 418.

Accordingly, a system and method in accordance with the present invention allows for multiple operating systems to be provided to an SUT as an attribute of the manufacturing process. Accordingly, a particular operating system can be provided on SUT for one part of the manufacturing while another operating system can be provided on the SUT for another part of the manufacturing process.

ADVANTAGES

The system and method in accordance with the present invention addresses the manufacturing requirements of the emerging Itanium-based products, as well as the emerging "server-dense" solutions. There is currently no industry manufacturing solution for these products.

1. No broad Requirement for Local Media.
    a. Broad product coverage facilitates usage on open bay (DASD-less) and diskette-less products.
    b. Solves local media issues by eliminating the need for local media creation, labeling, wear management, level control, and the costs associated with these activities.
    c. Better throughput. In the case of an internal or external diskette, the system in accordance with the present invention provides faster boot times than its mechnical peers.

2. Support for multiple operating systems
   a. Dynamic operating system selection allows a Test Engineer to select the appropriate operating system as an attribute of the manufacturing operation. The tool(s) used within the operation will determine the required operating system. For example, a SUT may be flashed under EFI 1.10, tested under Red Had Linux 9.0, and exercised under Windows XP Pro. The sequence and frequency is determined by the test engineer for a given product.
   b. No requirement for operating system standardization as any number of operating systems can be booted throughout the process. The system in accordance with the present invention is well suited as a cross-brand and cross-divisional solution since it does not require its users to standardize on any specific operating system. For example, one division may be Microsoft-centric while another may have a strong affinity for Linux.
   c. Support for contemporary operating systems removes the traditional, DOS-specific issues concerning memory management, device driver support, and the limitations of a single-tasking environment.
   d. Automated, "human-less" manufacturing boot image updates can be performed as no local media exists to gather, update, and/or replace. Updates are pushed to the servers via the network.
3. Support for Multiple Architectures In addition to dynamic operating system selection, the system in accordance with the present invention also provides architecture flexibility.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer manufacturing system comprising:
   a first server storing a plurality of boot images, each boot image corresponding to a different operating system; and
   a system under test (SUT) including a network adapter and a boot loader, the boot loader to load a first boot image of the plurality of boot images onto the system under test (SUT) during a first part of a manufacturing process of the system under test (SUT), the boot loader to further load a second boot image of the plurality of boot images onto the system under test (SUT) during a second part of the manufacturing process of the system under test (SUT),
   wherein the first boot image corresponds to a first operating system and the second boot image corresponds to a second operating system that is different from the first operating system, and wherein the first boot image and the second boot image are received by the system under test (SUT) through the network adapter,
   and wherein the first server assigns a MAC address to the network adapter during the manufacturing process of the system under test (SUT), and the boot loader uses the MAC address assigned to the network adapter to determine a given boot image of the plurality of boot images to load onto the system under test (SUT) from the first server.

2. A method for allowing a system under test (SUT) to boot a plurality of operating systems during a manufacturing process of the system under test (SUT) without a need for local media, the method comprising:
   storing a plurality of boot images on a first server, each boot image corresponding to a different operating system;
   loading a first boot image of the plurality of boot images onto the system under test (SUT) during a first part of a manufacturing process of the system under test (SUT), and loading a second boot image of the plurality of boot images onto the system under test (SUT) during a second part of the manufacturing process of the system under test (SUT),
   wherein the first boot image corresponds to a first operating system and the second boot image corresponds to a second operating system that is different from the first operating system, and wherein the first boot image and the second boot image are received by the system under test (SUT) from the first server through a network adapter of the system under test (SUT), and wherein the method further includes
   assigning a MAC address to the network adapter of the system under test (SUT) during the manufacturing process of the system under test (SUT),
   wherein loading a first boot image includes using the MAC address assigned to the network adapter to determine a given boot image of the plurality of boot images to load onto the system under test (SUT) from the first server.

3. A computer readable medium encoded with a computer program for allowing a system under test (SUT) to boot a plurality of operating systems without a need for local media, the computer program containing computer executable code for:
   storing a plurality of boot images on a first server, each boot image corresponding to a different operating system; and
   loading a first boot image of the plurality of boot images onto the system under test (SUT) during a first part of a manufacturing process of the system under test (SUT), and loading a second boot image of the plurality of boot images onto the system under test (SUT) during a second part of the manufacturing process of the system under test (SUT),
   wherein the first boot image corresponds to a first operating system and the second boot image corresponds to a second operating system that is different from the first operating system, and wherein the first boot image and the second boot image are received by the system under test (SUT) from the first server through a network adapter of the system under test (SUT), and wherein the computer program further comprises computer executable code for
   assigning a MAC address to the network adapter of the system under test (SUT) during the manufacturing process of the system under test (SUT),
   wherein the computer executable code for loading a first boot image includes computer executable code for using the MAC address assigned to the network adapter to determine a given boot image of the plurality of boot images to load onto the system under test (SUT) from the first server.

4. The computer manufacturing system of claim 1, wherein the system under test (SUT) consists of a single processing system.

5. The computer manufacturing system of claim 1, wherein the system under test (SUT) comprises a server dense architecture including a plurality of processing systems.

6. The computer manufacturing system of claim 1, wherein the boot loader comprises preboot code within the system under test (SUT).

7. The method of claim 2, wherein the system under test (SUT) consists of a single processing system.

8. The method of claim 2, wherein the system under test (SUT) comprises a server dense architecture including a plurality of processing systems.

9. The method of claim 2, wherein loading a second boot image includes rebooting the system under test (SUT) prior to activation of the second boot image.

10. The computer readable medium of claim 3, wherein the system under test (SUT) consists of a single processing system.

11. The computer readable medium of claim 3, wherein the system under test (SUT) comprises a server dense architecture including a plurality of processing systems.

12. The computer readable medium of claim 3, wherein the program instructions for loading a second boot image include program instructions for the system under test (SUT) prior to activation of the second boot image.

* * * * *